(No Model.) 3 Sheets—Sheet 1.
LA VERNE W. NOYES.
BOOK HOLDER.
No. 335,085. Patented Jan. 26, 1886.
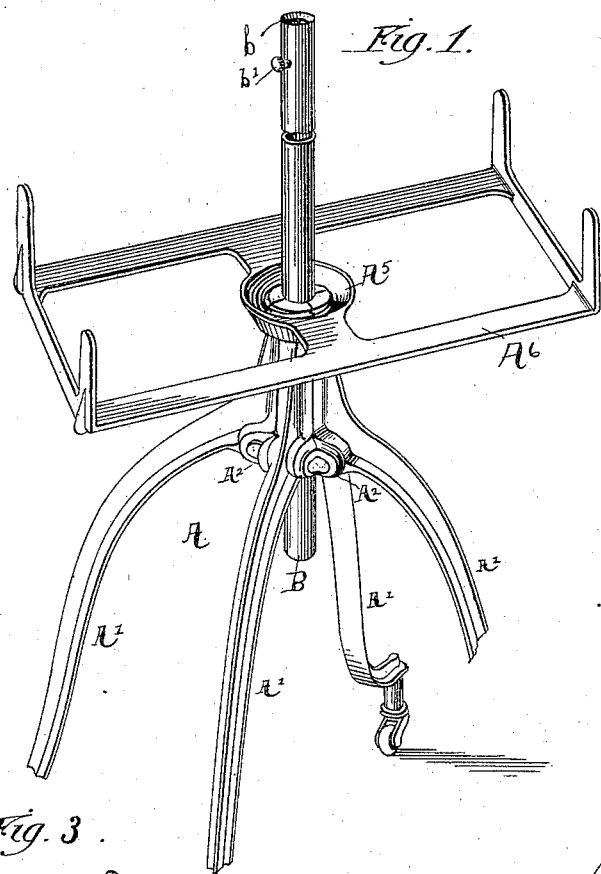
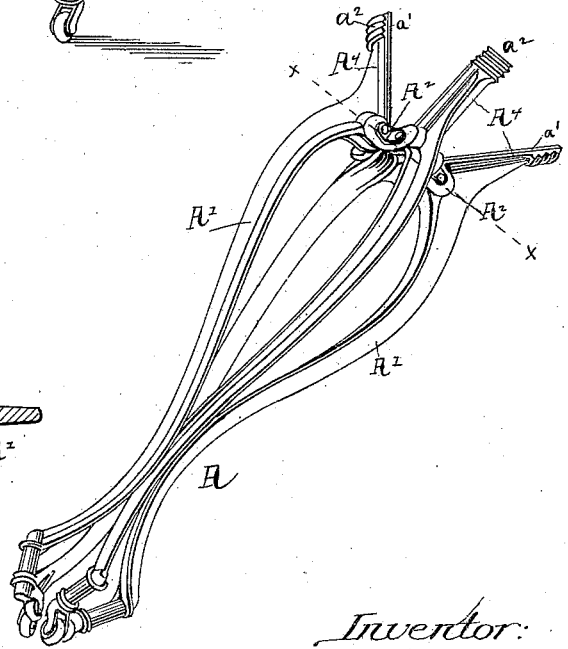
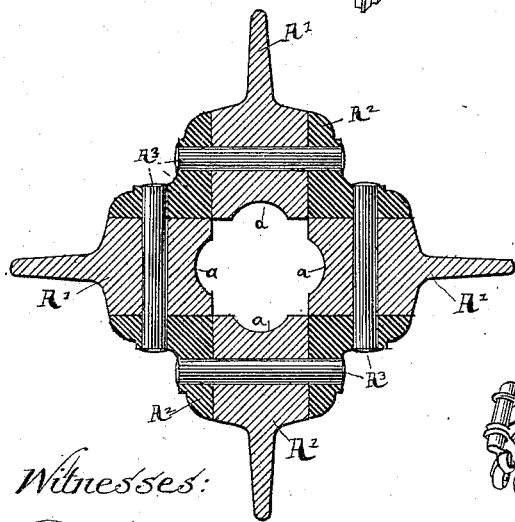
Witnesses:
Frank L. Blanchard
I. K. West.
Inventor:
La Verne W. Noyes.
By Attorneys.

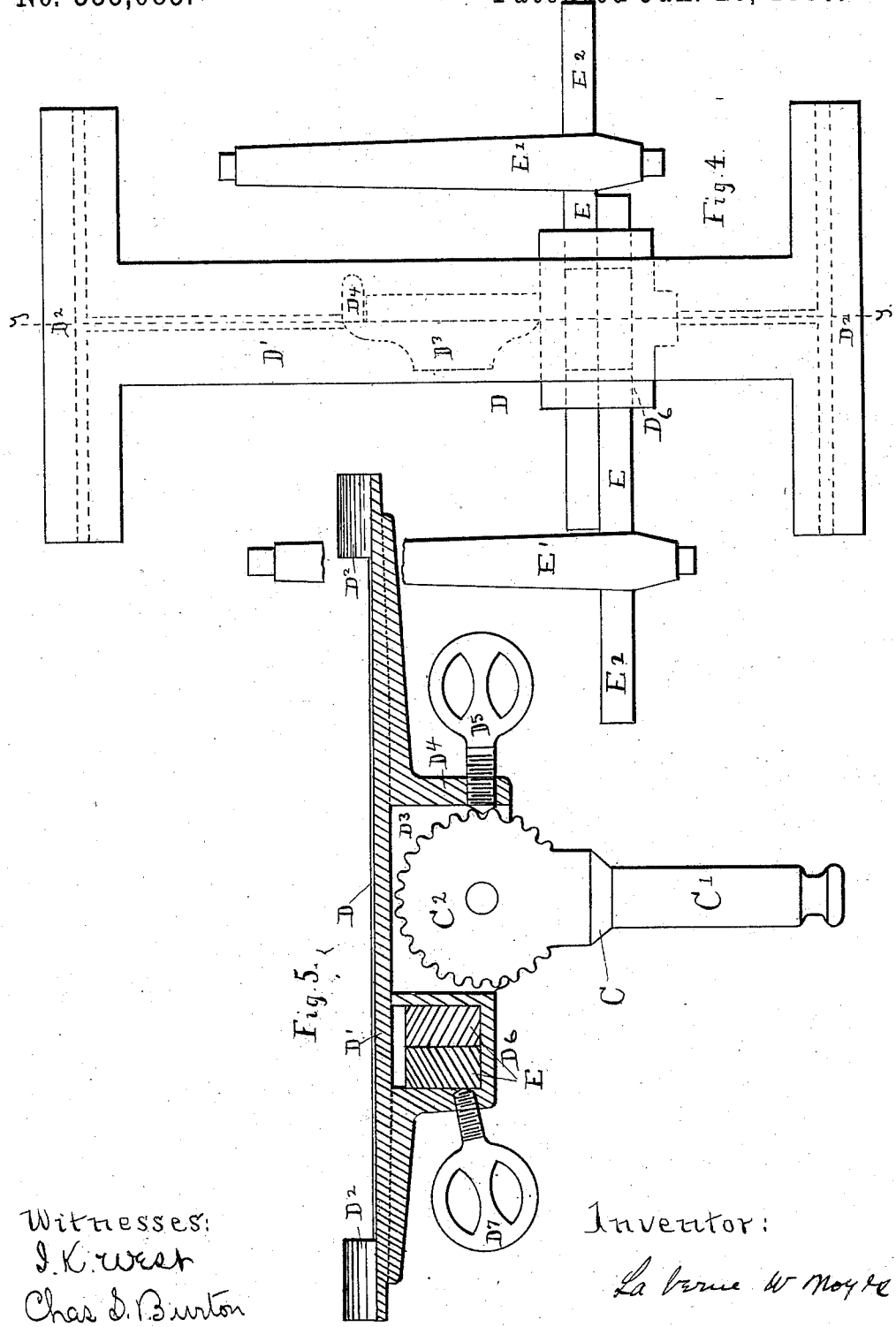

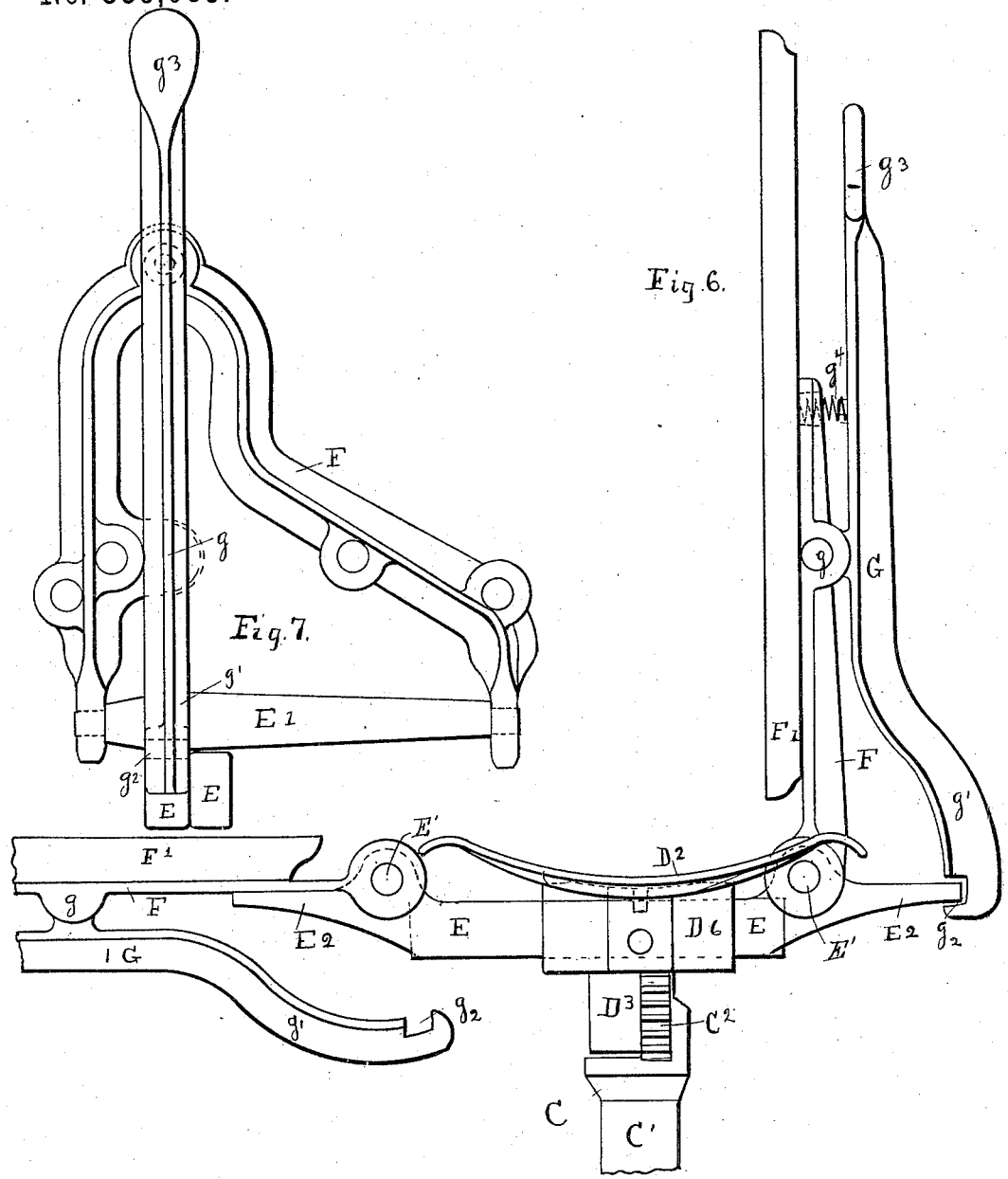

UNITED STATES PATENT OFFICE.

LA VERNE W. NOYES, OF CHICAGO, ILLINOIS.

BOOK-HOLDER.

SPECIFICATION forming part of Letters Patent No. 335,085, dated January 26, 1886.

Application filed January 12, 1885. Serial No. 152,695. (No model.)

*To all whom it may concern:*

Be it known that I, LA VERNE W. NOYES, a citizen of the United States, and residing at Chicago, in the county of Cook and State of Illinois, have invented certain new and useful Improvements in Book-Holders, which are fully described in the following specification.

One part of this invention relates to the base-support of a book holder or stand comprising the following features, viz: first, the legs pivoted to clips which alternate therewith and have ears by which they are bolted together, the bolts which join them serving as the pivots on which the legs hang, said legs being provided with spurs, which extend above said pivots and adapted to be in contact and form stops for each other when the legs are extended, and thereby limit the spread of the legs; second, the legs and their spurs, as above set forth, said spurs adapted to come into contact by approaching each other radially as the legs are spread, but so shaped that a stem or standard may be inserted between them at the center, which they radially approach, and be thus clamped between them as they are made to approach each other by spreading the legs; third, providing the surfaces of said spurs, which are, as above described, made to bear against the inserted stem, with a sheath or covering of yielding material—as felt, leather, or rubber packing—whereby the pressure caused by spreading the legs may give the spurs so covered a firm frictional grasp upon the inserted stem, and so that when slight contact has been established between such surfaces and the stem the weight of such stem and its sustained parts may tend to draw said surfaces closer together and increase their grasp upon the stem; fourth, making the extensions which constitute such spurs slightly tapering toward their ends, and providing a ring or collar adapted to encircle their said ends and be forced down over and around them, clamping them securely together and against the central stem, and, as one form of such collar or ring and corresponding form of such spur, making the tapered ends of the spurs exteriorly screw-threaded, and making the collar correspondingly interiorly screw-threaded, so that the latter may be forced down around the latter by being screwed down until sufficient clamping-pressure is produced to hold the stem securely.

A second part of this invention relates to the book shelf or holder proper and the devices for adjusting, folding, and securing it, and comprises the following features, viz: first, providing a central support for the book-shelf and shelf folding and adjusting mechanism, terminating below in a spindle and providing the upper end of the stem with a socket adapted to receive such spindle, thereby adapting the entire book-shelf to be rotated horizontally about the center of said spindle and stem; second, providing said support with a vertical serrated disk, and providing also a direct supporting-piece for the back of the book, called the "back-rest," which shall terminate below in a vertical disk pivoted to the center of the first-named disk, and provided with a lip overhanging the serrated edge of the latter, said lip having a set-screw adapted to be screwed into engagement with its said serrations, whereby the book upon said support may be adjusted and fixed inclined at any desired angle; third, providing said back-rest underneath the surface on which the book is designed to rest with a transverse horizontal slide bearing or bearings, and providing set-screw or set-screws adapted to clamp said slides in said bearing or bearings, (the preferable structure being to provide a single bearing large enough for said slides to lie side by side and be clamped by a single set-screw,) and pivoting the side shelves or the plates to which they are fixed to said slides—one shelf to each slide—whereby the said shelves may be adjusted and secured at any desired distance apart corresponding to the thickness of the book; fourth, pivoting to each of said shelf-plates a lever having one end reaching down over a projecting tooth or spur on the horizontal slide and provided with a notch to engage said spur, and having its other end extending up (or out) toward the edge of the shelf and provided with a thumb-piece, said lever pivoted between the said notch or point of engagement with the spur and said thumb-piece, and provided with a spring tending to throw the upper end out from the shelf and the lower end in, so that the notch may engage the spur, whereby the said lever may lock the shelf in a vertical position, and may be released by pressing the thumb-piece to release the notch from the spur and allow the shelf to be placed horizontal; fifth, providing a projecting spur on the horizontal slide, to serve as a stop and rest for the shelf, when the latter is placed in a horizontal position, and preferably arranging the spur, which serves as the detent for the locking-lever, to serve also as such stop and rest for the shelf.

Figure 1 is a perspective of the supporting-standard with the stem in position and clamped in place by the screw-collar. Fig. 2 shows the legs folded together as for shipment. Fig. 3 is a horizontal section through the plane $x\ x$ in Fig 2, showing the construction of the joint. Fig. 4 is a plan of the book-holder proper with its shelves, their plates and levers removed, showing the back-rest, the slides, and the pivots thereon for the shelf-plates. Fig. 5 is a vertical section through $y\ y$ in Fig. 4. Fig. 6 is a front elevation of the book-holder with one shelf raised, closed, and the other lying open. Fig. 7 is a side elevation of the same, showing the plates in detail. Fig. 8 is a section of one of the spurs on the leg, showing the sheathing.

A is the base-support, consisting of the legs A' and the intervening clips $A^2$ and their connecting-bolts $A^3$, which constitute the pivots of the legs.

$A^4$ are spurs extending from the legs above the pivots at an angle to the general direction of the legs to which they respectively pertain. They come into contact by their lateral edges $a''$, and at the same time constitute the stops between which the stem is clamped and held. They have their inner faces, $a\ a\ a\ a$, shaped to fit the stem and covered with a sheathing, $a'\ a'\ a'\ a'$, of rubber, felt, or leather, or similar yielding material, for the purpose of improving the frictional grasp of the spurs when clamped against the stem and to avoid marring the surface of the stem. The upper ends, $a^2$, of the spurs $A^4$ are made slightly tapering and exteriorly screw-threaded, as illustrated.

$A^5$ is a screw-collar, adapted to be screwed about and clamp together the ends of the spurs $A^4$. The flanges of the collar may be expanded, as illustrated, to form the rack or shelf $A^6$.

B is the main stem of the book-holder. It fits the aperture within the spurs $A^4$, and is clamped by them when the legs are spread. It has in its upper end the socket $b$, to receive the spindle, which forms the lower end of the book-shelf support. A set-screw, $b'$, may be employed to enter the circular groove $b''$ in the spindle and secure the latter from accidental escape from the socket $b$, and by being set in, so as to bind the spindle, secure the book-holder against rotary movement.

C is the book-shelf support, consisting of the spindle C' and the serrated or scalloped vertical disk $C^2$.

D is the back-rest, comprising the parts which immediately sustain the book—viz., the longitudinal and transverse bars D' and $D^2\ D^2$, respectively, and the vertical disk $D^3$, below said bars, pivoted at its center to the disk $C^2$, at the center of the latter, and having the lip $D^4$, overhanging the serrated edge of the disk $C^2$, said lip bearing the set-screw $D^5$, adapted to be set against the edge and into the serrations of the disk $C^2$. The longitudinal bar D' has an enlargement, $D^6$, on its under side, wherein is provided the horizontal slide-bearing for the slides, hereinafter described, and the set-screw $D^7$, adapted to protrude into said aperture or bearing and clamp the slides therein.

E E are the horizontal slides which lie and slide side by side in said slide-bearing and are clamped therein by the set-screw $D^7$. They are provided with the extensions E' E' to form the pivots of the shelf-brackets, and with the stops or spurs $E^2\ E^2$, which serve the double purpose of stops for the shelf-plates when the shelves are placed horizontal, and of detents for the locking levers or latches when the shelves are closed together vertical. Both positions are shown in Fig. 6.

F F are the shelf-plates pivoted to the slides E E upon the extensions E' E', and rocking over said pivots, being stopped at their lowest position by coming into contact with the stops $E^2\ E^2$. The book-shelves F' F' are preferably made of wood and secured to the brackets, though manifestly the plates might be made of such extent and form as to obviate the necessity for such shelves.

G G are levers pivoted at $g\ g$ to the shelf-brackets, having their lower portions, $g'\ g'$, turned outward, so as to pass outside the ends of the spurs $E^2\ E^2$, and provided at their lower ends on their inner surfaces with the notches $g^2\ g^2$, to engage the ends of the spurs, respectively, and lock the shelves closed. The upper ends of the levers have the thumb-pieces $g^3\ g^3$, and at any convenient point a spring, $g^4$, is provided for each lever to rock it in the direction to cause the notch $g^2$ to engage the spur $E^2$— that is, to throw the upper end outward and the lower end inward with respect to the shelf and book. This spring is conveniently placed, as shown, between the pivot and the end bearing the thumb-piece $g^3$.

I am aware that stands have heretofore been constructed with the legs pivoted to a central hub or ring and adapted to fold together; but in all such stands heretofore made the hub is continuous either within the circle in which the leg-pivots are arranged or within the circle in which the spurs extended up from said legs stand, so that such hub itself serves as the stop for the legs or for the said spurs when the legs are spread, whereas in my device there is no continuous hub inside the circle of the leg-pivots or their spurs; but when the legs are spread the said spurs approach each other radially until they stop against each other or against the adjustable standard inserted between them; also in all former structures of this class with which I am familiar when an adjustable vertical standard or stem is to be inserted between such folding legs the hub is vertically pierced to receive it, and it is secured by a set-screw or equivalent device in the hub; but in my device, as pointed out, the leg-spurs directly clamp the central stem, which they are adapted to do by reason of the absence of any central tube or core of the hub.

I am also aware that an encircling annulus or band has heretofore been employed to bend the leg-spurs to the hub; but such annulus has never heretofore to my knowledge been employed co-operating with the tapered spurs to cause the latter to clamp the vertical stem or standard at desired height, thereby dispensing with a set-screw in the hub for that purpose.

I am also aware that book-holders have been heretofore constructed having a central support provided with laterally-projecting arms upon which shelf-supporting devices have been adapted to slide to adjust the distance of such shelves to conform to the thickness of the book to be received between them; and I do not claim, broadly, adapting the shelves to slide to and from each other upon the central support; but I am not aware of any former structure in which the sliding bars are fixed to the shelf-pivots and slide by each other through the central support, as in my device, whereby the lateral extent of the entire structure is diminished.

I do not claim any of the structures above pointed out as being heretofore known; but I claim—

1. In combination, substantially as hereinbefore set forth, the horizontal leg-pivots all rigidly secured together and arranged about a center in the position of chords of a circle, the legs hung upon said pivots, respectively, and provided with extensions upward from said pivots, said extensions adapted to come into lateral contact and stop against each other as the legs are spread.

2. In combination, substantially as hereinbefore set forth, the clips arranged about a center and rigidly secured together solely by horizontal bolts adapted to serve as pivots for the legs, the legs pivoted upon said bolts, respectively, and extended upward beyond said pivots, and having on said extensions lateral surfaces adapted to come into lateral contact and stop each other as the legs are spread.

3. In combination, substantially as hereinbefore set forth, the horizontal leg-pivots all rigidly secured together and arranged about a center in the position of chords of a circle, the legs hung upon said pivots, respectively, and having extensions above said pivots adapted to approach each other radially as the legs are spread, and a central stem inserted and adapted to slide vertically within the circle of said extensions and to stop their radial approach and be clamped by them.

4. In combination, substantially as hereinbefore set forth, the horizontal leg-pivots all rigidly secured together and arranged about a center in the position of chords of a circle, the legs hung upon said pivots, respectively, and provided with extensions upward from said pivots, said extensions adapted to come into contact and stop against each other as the legs are spread, and a collar adapted to encircle said extensions and retain them stopped against each other.

5. In combination, substantially as set forth, the horizontal leg-pivots all rigidly secured together and arranged about a center in the positions of chords of a circle, the legs hung upon said pivots, respectively, and having extensions above said pivots adapted to approach each other radially as the legs are spread, a central stem inserted and adapted to slide vertically within the circle of said extensions, and to stop their radial approach and be grasped between them, and a collar adapted to encircle the ends of said extensions and re-enforce their grasp upon the central stem and retain them closely about it.

6. In combination, substantially as set forth, the horizontal leg-pivots rigidly secured together and arranged as described, the legs hung thereon, and having the upward extensions, as and for the purpose described, said extensions tapered and exteriorly screw-threaded, and the clamping-collar interiorly screw-threaded to engage the thread of the extensions, for the purpose set forth.

7. The clamp-collar $A^5$, located and adapted to clamp the leg-extensions about the central stem, and provided with lateral extensions constituting a rack or shelf, substantially as set forth.

8. In a book-holder, in combination with the central support, the horizontal transverse slides sustained and adapted to slide side by side through said central support, and having the pivots of the shelf-plates, the shelf-brackets pivoted to said slides, means for securing the said slides in the central support, and means for securing the shelves in a vertical position over their pivots, substantially as set forth.

9. In a book-holder, in combination with the central support, the horizontal transverse slides sustained and adapted to slide side by side through said central support, and having stops for the shelves and pivots for the shelf-plates, the shelf-brackets pivoted on said slides, respectively, means for securing said slides in the central support, and means for securing the shelf-brackets in vertical position over their pivots, substantially as set forth.

10. In a book-holder, in combination with the shelf-pivots and the parts which support them, and the detent-spurs rigid with the pivots, respectively, the shelf-brackets adapted to rock over said pivots, the locking levers or latches pivoted to said shelf-plates, respectively, and provided each with a thumb-piece extended near the edge of the shelf, and adapted at the other end to engage the detent-spurs when the shelves are vertical, and springs located and adapted to throw the latches into engagement with the spurs, respectively, substantially as set forth.

In testimony whereof I have hereunto set my hand, in the presence of two witnesses, at Chicago, Illinois, this 7th day of January, A. D. 1885.

LA VERNE W. NOYES.

Attest:
I. K. WEST,
CHAS. S. BURTON.